(12) United States Patent
Stevanovic (10) Patent No.: US 11,714,730 B2
(45) Date of Patent: Aug. 1, 2023

(54) SYSTEMS AND METHODS FOR HIGH AVAILABILITY, FAILOVER AND LOAD BALANCING OF HETEROGENEOUS RESOURCES

(71) Applicant: D-WAVE SYSTEMS INC., Burnaby (CA)

(72) Inventor: Radomir Stevanovic, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 128 days.

(21) Appl. No.: 16/997,252

(22) Filed: Aug. 19, 2020

(65) Prior Publication Data
US 2021/0056003 A1 Feb. 25, 2021

Related U.S. Application Data

(60) Provisional application No. 62/889,264, filed on Aug. 20, 2019.

(51) Int. Cl.
*G06F 9/48* (2006.01)
*G06F 9/50* (2006.01)
(Continued)

(52) U.S. Cl.
CPC ........ *G06F 11/2028* (2013.01); *G06F 9/4843* (2013.01); *G06F 9/505* (2013.01);
(Continued)

(58) Field of Classification Search
CPC ........ G06F 9/4843; G06F 9/505; G06F 9/541; G06F 11/2028; G06F 2201/805; G06N 10/00
See application file for complete search history.

(56) References Cited

U.S. PATENT DOCUMENTS

| 1,102,227 A | 7/1914 | Baird |
| 7,135,701 B2 | 11/2006 | Amin et al. |

(Continued)

FOREIGN PATENT DOCUMENTS

| KR | 20160132943 A | 11/2016 |
| KR | 20180067006 A | 6/2018 |

(Continued)

OTHER PUBLICATIONS

Amin, "Effect of Local Minima on Adiabatic Quantum Optimization," Physical Review Letters 100(130503), 2008, 4 pages.

(Continued)

*Primary Examiner* — Emerson C Puente
*Assistant Examiner* — Jonathan R Labud
(74) *Attorney, Agent, or Firm* — Cozen O'Connor (57) ABSTRACT

Systems, methods and article provide the services of heterogeneous resources, for example the services analog processors, e.g., quantum processors, in a robust manner that can include high availability, failover, and load balancing of the heterogeneous resources. A virtual solver is selected based at least in part on a first set of requirements, a first set of analog processors is identified based at least in part on the first set of requirements, and a first handle returned to the first virtual solver. A load balancer may balance loads. Failure over may be implemented.

16 Claims, 4 Drawing Sheets

(51) Int. Cl.
    *G06F 9/54* (2006.01)
    *G06F 11/20* (2006.01)
    *G06N 10/00* (2022.01)
(52) U.S. Cl.
    CPC ............. *G06F 9/541* (2013.01); *G06N 10/00* (2019.01); *G06F 2201/805* (2013.01)

(56) References Cited

U.S. PATENT DOCUMENTS

| | | | |
|---|---|---|---|
| 7,369,035 B2 | 5/2008 | Konno et al. | |
| 7,398,163 B2 | 7/2008 | Tsukamoto et al. | |
| 7,418,283 B2 | 8/2008 | Amin | |
| 7,533,068 B2 | 5/2009 | Maassen et al. | |
| 7,619,437 B2 | 11/2009 | Thom et al. | |
| 7,639,035 B2 | 12/2009 | Berkley | |
| 7,870,087 B2 | 1/2011 | MacReady et al. | |
| 7,870,523 B1* | 1/2011 | Uziel | G06F 11/263 703/2 |
| 7,876,248 B2 | 1/2011 | Berkley et al. | |
| 7,898,282 B2 | 3/2011 | Harris et al. | |
| 7,984,012 B2 | 7/2011 | Coury et al. | |
| 8,008,942 B2 | 8/2011 | Van et al. | |
| 8,035,540 B2 | 10/2011 | Berkley et al. | |
| 8,190,548 B2 | 5/2012 | Choi | |
| 8,195,596 B2 | 6/2012 | Rose et al. | |
| 8,195,726 B2 | 6/2012 | MacReady et al. | |
| 8,283,943 B2 | 10/2012 | Van Den Brink et al. | |
| 8,421,053 B2 | 4/2013 | Bunyk et al. | |
| 8,437,818 B1 | 5/2013 | Tolpygo et al. | |
| 8,464,542 B2 | 6/2013 | Hilton et al. | |
| 8,494,993 B2 | 7/2013 | Harris et al. | |
| 9,875,444 B2 | 1/2018 | King | |
| 9,898,689 B2 | 2/2018 | Shamaie | |
| 10,031,887 B2 | 7/2018 | Raymond | |
| 10,169,445 B2 | 1/2019 | Weinstein et al. | |
| 10,552,755 B2 | 2/2020 | Lanting et al. | |
| 10,846,366 B1 | 11/2020 | Otterbach et al. | |
| 11,062,227 B2 | 7/2021 | Amin et al. | |
| 11,194,573 B1 | 12/2021 | Smith | |
| 11,288,121 B2 | 3/2022 | Katabarwa | |
| 2002/0163518 A1 | 11/2002 | Rising et al. | |
| 2005/0224784 A1 | 10/2005 | Amin et al. | |
| 2006/0225165 A1 | 10/2006 | Maassen et al. | |
| 2007/0239366 A1 | 10/2007 | Hilton et al. | |
| 2008/0065573 A1 | 3/2008 | MacReady | |
| 2009/0070402 A1 | 3/2009 | Rose et al. | |
| 2009/0075825 A1 | 3/2009 | Rose et al. | |
| 2009/0232191 A1 | 9/2009 | Gupta et al. | |
| 2009/0299947 A1 | 12/2009 | Amin et al. | |
| 2010/0275206 A1* | 10/2010 | Mewhinney | G06F 9/50 718/100 |
| 2010/0281885 A1 | 11/2010 | Black et al. | |
| 2011/0022820 A1 | 1/2011 | Bunyk et al. | |
| 2011/0060710 A1 | 3/2011 | Amin | |
| 2011/0065585 A1 | 3/2011 | Lanting et al. | |
| 2011/0231462 A1 | 9/2011 | MacReady et al. | |
| 2011/0298489 A1 | 12/2011 | Van et al. | |
| 2013/0117200 A1 | 5/2013 | Thom | |
| 2013/0282636 A1 | 10/2013 | MacReady et al. | |
| 2014/0025606 A1 | 1/2014 | MacReady | |
| 2014/0187427 A1 | 7/2014 | MacReady et al. | |
| 2014/0337612 A1 | 11/2014 | Williams | |
| 2015/0269124 A1 | 9/2015 | Hamze et al. | |
| 2015/0297949 A1 | 10/2015 | Aman et al. | |
| 2015/0358022 A1 | 12/2015 | McDermott et al. | |
| 2015/0363708 A1 | 12/2015 | Amin et al. | |
| 2016/0321559 A1 | 11/2016 | Rose et al. | |
| 2017/0177534 A1 | 6/2017 | Mohseni et al. | |
| 2017/0255629 A1 | 9/2017 | Thom et al. | |
| 2017/0255872 A1 | 9/2017 | Hamze et al. | |
| 2017/0300817 A1* | 10/2017 | King | G06N 3/126 |
| 2017/0323195 A1 | 11/2017 | Crawford et al. | |
| 2018/0091440 A1 | 3/2018 | Dadashikelayeh et al. | |
| 2018/0096085 A1 | 4/2018 | Rubin | |
| 2018/0218279 A1 | 8/2018 | Lechner et al. | |
| 2018/0246848 A1 | 8/2018 | Douglass et al. | |
| 2018/0246851 A1 | 8/2018 | Zaribafiyan et al. | |
| 2018/0260245 A1 | 9/2018 | Smith | |
| 2018/0336166 A1 | 11/2018 | Forster | |
| 2018/0365585 A1 | 12/2018 | Smith et al. | |
| 2019/0019101 A1 | 1/2019 | Neven | |
| 2020/0005186 A1 | 1/2020 | Romero et al. | |
| 2020/0026551 A1 | 1/2020 | Ducore et al. | |
| 2020/0027029 A1 | 1/2020 | Linvill | |
| 2020/0073739 A1* | 3/2020 | Rungta | G06F 8/60 |
| 2020/0089832 A1 | 3/2020 | Shao et al. | |
| 2020/0134502 A1 | 4/2020 | Anschuetz et al. | |
| 2020/0226197 A1 | 7/2020 | Woerner et al. | |
| 2020/0234172 A1 | 7/2020 | King et al. | |
| 2021/0097776 A1 | 4/2021 | Faulkner et al. | |
| 2021/0334081 A1 | 10/2021 | Chong et al. | |
| 2021/0357797 A1 | 11/2021 | Karalekas et al. | |
| 2022/0019928 A1 | 1/2022 | Jiang et al. | |

FOREIGN PATENT DOCUMENTS

| | | |
|---|---|---|
| WO | 2009152180 A2 | 12/2009 |
| WO | 2012064974 A2 | 5/2012 |
| WO | 2013006836 A1 | 1/2013 |
| WO | 2015143439 A1 | 9/2015 |
| WO | 2018119522 A1 | 7/2018 |

OTHER PUBLICATIONS

B. Bauer et al., "Hybrid Quantum Classical Approach to Correlated Materials", arXiv.1510.03859V2, Aug. 29, 2016.
Booth, M. et al., "Partitioning Optimization Problems for Hybrid Classical/Quantum Execution," D-Wave Technical Report, Jan. 9, 2017, 13 pages.
E. Blanzieri et al., "Quantum Annealing Tabu Search for QUBO Optimization", arXiv.1810.09342V1, Oct. 22, 2018.
Inoue et al. "Simulation and Experimental Demonstration of Logic Circuits Using an Ultra-Low-Power Adiabatic Quantum-Flux-Parametron," in IEEE Transactions on Applied Superconductivity, vol. 23, No. 3, pp. 1301105-1301105, Jun. 2013.
International Search Report and Written Opinion for PCT/US2020/013366, dated May 7, 2020, 9 pages.
Wocjan, Pawel, and Anura Abeyesinghe. "Speedup via quantum sampling." Physical Review A 78.4 (2008): 042336.
Non-Final Office Action Issued in U.S. Appl. No. 16/601,097 dated Apr. 8, 2022, 22 pages.
Notice of Allowance dated Feb. 2, 2022, for Thom, "Systems and Methods for Analog Processing of Problem Graphs Having Arbitrary Size and/or Connectivity" U.S. Appl. No. 16/778,295; 29 pages.
O. A. Mukhanov, "Energy-Efficient Single Flux Quantum Technology," in IEEE Transactions on Applied Superconductivity, vol. 21, No. 3, pp. 760-769, Jun. 2011, doi: 10.1109/TASC.2010.2096792.
Pastorello, D. et al., "Quantum Annealing Learning Search for Solving QUBO Problems," arXiv:1810.09342v3 [quant-ph] Aug. 13, 2019, 17 pages.
S. R. Ekanayake, T. Lehmann, A. S. Dzurak and R. G. Clark, "Quantum bit controller and observer circuits in SOS-CMOS technology for gigahertz low-temperature operation," 2007 7th IEEE Conference on Nanotechnology (IEEE Nano), 2007, pp. 1283-1287.
Tran, T. et al., "A Hybrid Quantum-Classical Approach to Solving Scheduling Problems," Proceedings of the Ninth International Symposium on Combinational Search, 2016, 9 pages.
Williams, "Systems and Methods for Interacting With a Quantum Computing System," U.S. Appl. No. 61/811,457, filed Apr. 12, 2013, 55 pages.
Goldman, et al., "Parameter-less Population Population Pyramid", Beacon Center for the Study of evolution in Action, 2014, pp. 785-792.
Notice of Allowance for U.S. Appl. No. 16/830,650, dated Jul. 15, 2022, 11 pages.

(56) References Cited

OTHER PUBLICATIONS

Thierens, "The Linkage Tree Genetic Algorithm", R. Schaefer et al. (Eds.): PPSN XI, Part I, LNCS 6238, pp. 264-273, Springer-Verlag Berlin Heidelberg 2010.
Non-Final Office Action dated Jun. 3, 2022 in U.S. Appl. No. 16/741,208.

* cited by examiner

SYSTEMS AND METHODS FOR HIGH AVAILABILITY, FAILOVER AND LOAD BALANCING OF HETEROGENEOUS RESOURCES

FIELD

This disclosure generally relates to providing the services of heterogeneous resources, and in particular providing the services of a plurality of analog processors, e.g., quantum processors, in a robust manner that can include high availability, failover, and load balancing of the heterogeneous resources.

BACKGROUND

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and $A(t)$, $B(t)$ are coefficients that can control the rate of evolution, and typically lie in the range [0,1].

In some implementations, a time varying envelope function can be placed on the problem Hamiltonian. A suitable delocalization Hamiltonian is given by:

$$H_D \propto -\frac{1}{2}\sum_{i=1}^{N} \Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij} \sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$.

Here, the $\sigma_i^z$ and $\sigma_i^z \sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

Aspect 1 A method of operation of a hybrid computing system is described, the hybrid computing system including at least one digital processor and a plurality of analog processors, the method executed by the at least one digital processor. The method may be summarized as comprising: receiving a first set of requirements; selecting a first virtual solver satisfying the first set of requirements; identifying a first set of analog processors in the plurality of analog processors satisfying the first set of requirements; and returning a first handle to the first virtual solver.

Aspect 2 The method of aspect 0 wherein receiving a first set of requirements includes receiving a first set of requirements for a first set of virtual solver features.

Aspect 3 The method of aspect 0 wherein selecting a first virtual solver satisfying the first set of requirements includes selecting a first virtual solver via a solver application programming interface.

Aspect 4 The method of aspect 0 wherein identifying a first set of analog processors in the plurality of analog processors satisfying the first set of requirements includes identifying a first set of quantum processors in a plurality of quantum processors satisfying the first set of requirements.

Aspect 5 The method of aspect 0 further comprising: receiving a problem via a solver application programming interface; queuing the problem in the first virtual solver queue; mapping the first virtual solver queue to a first set of analog processors queues of the first set of analog processors; and servicing the first virtual solver queue via a load balancer.

Aspect 6 The method of aspect 0 wherein receiving a problem via a solver application programming interface includes receiving, by the first virtual solver, a problem.

Aspect 7 The method of aspect 0 wherein servicing the first virtual solver queue via a load balancer includes dispatching a first task to a first one of the first set of analog processors queues.

Aspect 8 The method of aspect 0 wherein dispatching a first task to a first one of the first set of analog processors queues includes sequentially dispatching the first task to each one of the analog processor queues of the first set of analog processors queues.

Aspect 9 The method of aspect 0 wherein dispatching a first task to a first one of the first set of analog processor queues includes dispatching a first task to a first one of a set of quantum processor queues.

Aspect 10 The method of aspect 0 wherein mapping the first virtual solver queue to a set of analog processor queues includes mapping the first virtual solver queue to a set of quantum processor queues.

Aspect 11 The method of aspect 0 further comprising returning a problem status.

Aspect 12 A computing system may be summarized as comprising: at least one digital processor; a plurality of analog processors; and at least one non-transitory processor-readable medium communicatively coupleable to the at least one digital processor and that stores at least one of a set of processor-executable instructions or data which, when executed by the at least one digital processor, causes the at least one digital processor to: receive a first set of requirements; select a first virtual solver satisfying the first set of requirements; identify a first set of analog processors in the plurality of analog processors satisfying the first set of requirements; and return a first handle to the first virtual solver.

Aspect 13 The computing system of aspect 0 wherein the non-transitory processor-readable medium stores processor-executable instructions which, when executed, causes the digital processor to receive a first set of requirements for a first set of virtual solver features.

Aspect 14 The computing system of aspect 0 wherein the non-transitory processor-readable medium stores processor-executable instructions which, when executed, causes the digital processor to select a first virtual solver via a solver application programming interface.

Aspect 15 The computing system of aspect 0 wherein the non-transitory processor-readable medium stores processor-executable instructions which, when executed, causes the digital processor to identify a set of quantum processors satisfying the first set of requirements.

Aspect 16 The computing system of aspect 0 wherein the at least one non-transitory processor-readable medium stores processor-executable instructions which, when executed, further causes the at least one digital processor to: receive a problem via a solver application programming interface; queue the problem in a first virtual solver queue; map the first virtual solver queue to a first set of analog processors queues of the first set of analog processors; and service the first virtual solver queue via a load balancer.

Aspect 17 The computing system of aspect 0 wherein the non-transitory processor-readable medium stores processor-executable instructions which, when executed, causes the digital processor to receive, by the first virtual solver, a problem.

Aspect 18 The computing system of aspect 0 wherein the non-transitory processor-readable medium stores processor-executable instructions which, when executed, causes the digital processor to dispatch a first task to a first one of the first set of analog processor queues.

Aspect 19 The computing system of aspect 0 wherein the non-transitory processor-readable medium stores processor-executable instructions which, when executed, causes the digital processor to sequentially dispatch a first task to each one of the first set of analog processor queues.

Aspect 20 The computing system of aspect 0 wherein the non-transitory processor-readable medium stores processor-executable instructions which, when executed, causes the digital processor to dispatch a first task to a first one of a set of quantum processor queues.

Aspect 21 The computing system of aspect 0 wherein the non-transitory processor-readable medium stores processor-executable instructions which, when executed, causes the digital processor to map the first virtual solver queue to a set of quantum processor queues.

Aspect 22 The computing system of aspect 0 wherein the non-transitory processor-readable medium stores processor-executable instructions which, when executed, further causes the digital processor to return a problem status.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

In computing systems, including hybrid computing systems comprising digital and analog processors, it is desirable to implement high availability (HA) when multiple computing resources are available. Similarly, it is desirable to implement failover and load balancing.

HA, failover and load balancing are well studied problems when pertaining to identical or redundant resources, but not in the case of heterogeneous resources with varying degrees of similarity. An example of heterogeneous resources are analog computers, in particular quantum computers (or quantum computing systems). In the present application and the appended claims, terms "solver"/"resource" and "virtual solver"/"virtual resource" are often used interchangeably.

HA can be achieved, for example, by transferring the choice of a resource to the client side. Each client would maintain and update a list of available solvers/resources, together with their properties or features, ordered according to some preference. Each client would submit problems to the most preferred available solver. In case of a system error, client would need to re-submit the problem to the next-preferred available solver. However, this approach has drawbacks, for example: operations are not atomic, failover is not automatic and transparent to the client, load balancing is not guaranteed, and the client's solver preference is out of the service's control.

Alternatively, the selection of a solver may be transferred to the server side. Prior to submitting a problem, a client would request a list of available servers, according to a set of requirements on solver properties or features. The client would then submit the problem to the preferred solver (or the one preferred by server). In case of a system error (failure prior, during or after submitting a problem to the solver), the client would repeat the process, re-submitting the problem to another solver. Similarly, this approach also has some drawbacks, for example: operations are not atomic, failover is not automatic and transparent to the client. Load balancing is possible, but still not automatic and transparent. Additionally, solver preference can be controlled on the service side.

The systems and methods of the present disclosure facilitate high availability, failover and load balancing of heterogeneous resources, for example a set of quantum processors, by introducing a homogenizing layer of virtual solvers, with each solver defining a set of minimal requirements on solver features. High availability may be defined as a server fulfilling a user's request with the utmost reliability, by using a built-in failover mechanism that mitigates against the effects of any one component, or resource, failing. Therefore, it is desirable to implement a method of observing heterogeneous resources as uniform and/or interchangeable resources. If heterogeneous resources can be abstracted as homogeneous units, failover and load balancing are becoming possible.

Each quantum processor has a set of parameters and properties (also referred herein as 'features'), with fixed values or allowed ranges. Many parameters and properties may be shared by all or a subset of a set of quantum processors; however, this is not always the case. Some examples of features are:

The system status (e.g., online/offline).
The system has a defined number of active qubit (e.g., at least 2000 active qubits).
The system supports custom anneal schedule.
The anneal schedule has a defined number of control points (e.g., the anneal schedule can have at least 4 control points).
The system contains a subgraph (V,E).

The interchangeability of quantum processors in a set of quantum processors is relative and conditioned on a set of requirements that may be dependent on a specific problem or application to be submitted to the quantum processor and on the degree of accuracy the results of the problems need to be analyzed. For example, for entry-level applications, all quantum processors may be interchangeable, while for research applications, no two quantum processors are identical.

The notion of relative interchangeability may be formalized by introducing feature set contracts in a contractual layer, which then induce virtual solvers, one for each specific set of requirements.

In one example implementation, a digital processor would request a solver that conforms to a set of requirements, i.e., a contract (e.g., 'number of active qubits>2000', and 'anneal schedule available with at least 4 control points'). The digital processor would receive back a handle to an abstract or virtual solver that satisfies those requirements (i.e., fulfills the contract). Each virtual solver is dynamically, depending on the requirements, backed by a pool of physical resources (e.g., quantum processors). Accordingly, each virtual solver availability level is associated with each solver (e.g., if only one quantum processor is in the pool, the expected availability of the virtual solver would be lower than if multiple quantum processors are).

A digital processor would submit problems (or tasks) to the virtual solver. Problems submitted would be in a virtual queue specific for that virtual solver (e.g., in a queue for '2000+ qubits with support for 4+ anneal schedule points'). Failover will happen for each virtual queue separately, without the need to migrate problems between physical quantum processor queues. Load balancing is implemented on the contractual layer, balancing within the pool of quantum processors selected for the particular virtual solver, since all quantum processors in a single virtual solver's pool are considered equal in the context of that virtual solver.

Unlike in conventional systems, where one solver is paired with one quantum processor, in the systems of the present disclosure a virtual solver queue never goes offline, even if one or more quantum processors in the pool of quantum processors go offline. In the case where no physical quantum processor fits the requirements, problems fail with resource allocation error. Problems never have to be migrated to another queue; problems are atomically executed on the contract layer and they can either succeed or fail. Each virtual solver has independent failover capacity (e.g., if a quantum processor task fails, the contractual layer can retry with another physical quantum processor in the pool). Load balancing is possible since physical resources allocated on a load balancing layer, a layer below the contract layer) are identical within each virtual solver queue.

The systems and methods of the present disclosure introduce a new layer service (the contractual layer) in an existing service stack of a hybrid computing system comprising at least one digital processor and a plurality of heterogeneous quantum processors. The contractual layer formalizes the relative interchangeability of heterogeneous resources; thus, homogenizing those resources on all layers below. Consequently, high availability can be leveraged and failover and load balancing become possible.

Figure 1:
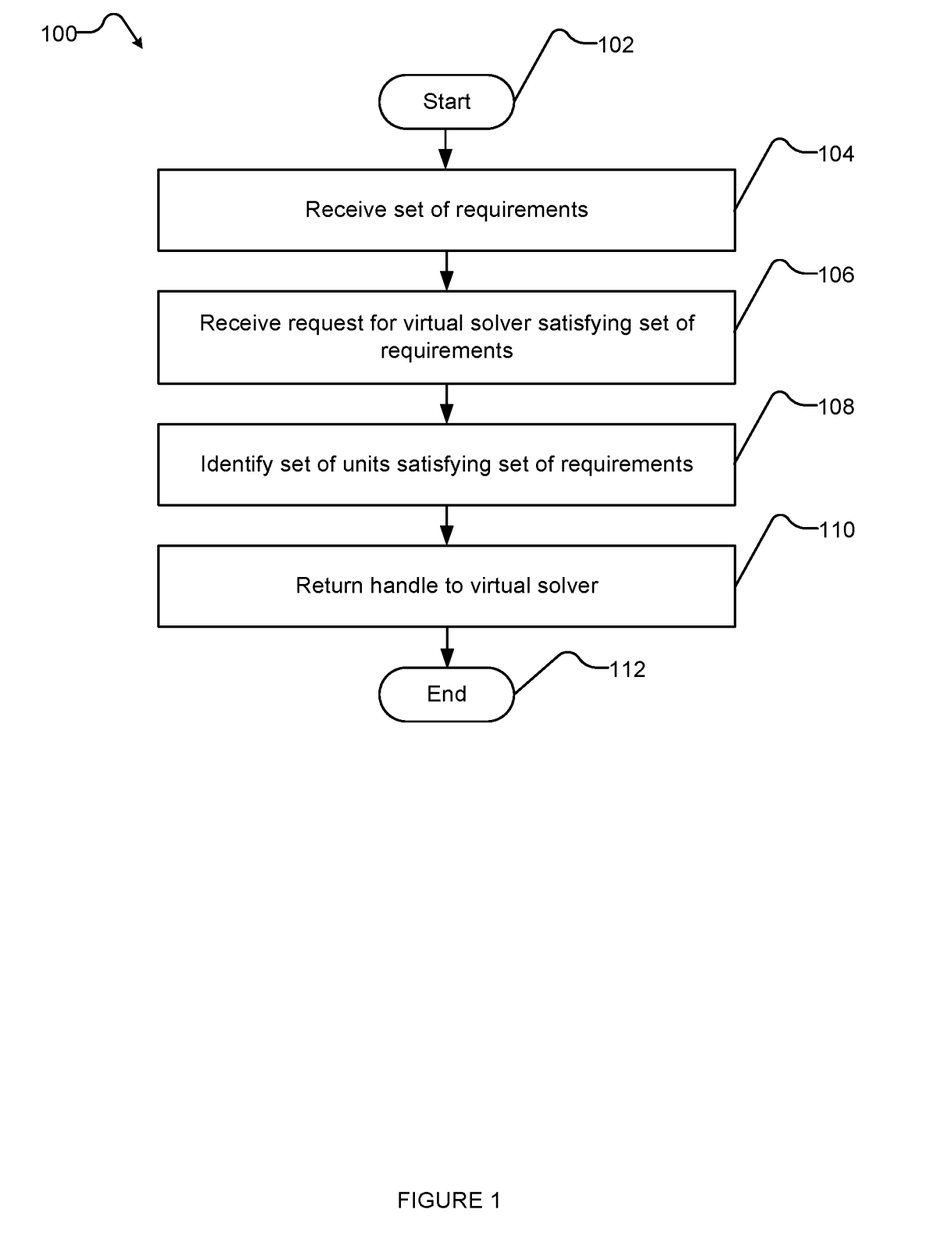
FIG. 1 is a flow diagram of an example method of selecting a virtual solver in a hybrid computing system comprising a plurality of analog processors.

FIG. 1 is a flow diagram of an example method 100 of selecting a virtual solver in a hybrid computing system comprising a plurality of analog processors. Method 100 comprises acts 102 to 112; however, a person skilled in the art will understand that the number of acts is an example, and, in some implementations, certain acts may be omitted, further acts may be added, and/or the order of the acts may be changed. Method 100 may be implemented by a digital processor in a hybrid computing system comprising at least one digital processor and a plurality of quantum processors.

Method 100 starts at 102, for example in response to a call from another routine.

At 104, the digital processor receives a set of requirements. The set of requirements may be determined by a user and received as part of a set on inputs.

At 106, the digital processor requests a virtual solver satisfying all of the set of requirements. The digital processor may request the virtual solver to a contract layer.

At 108, the contract layer identifies a virtual solver that satisfies all requirements in the set of requirements. The virtual solver is backed by a pool of physical quantum processors, all satisfying the set of requirements.

At 110, the contract layer returns to the digital processor a handle to the virtual solver. The digital processor can then use the handle to submit problems to the virtual server, as described in more details in FIG. 2.

At 112, method 100 terminates, until it is, for example, invoked again.

Figure 2:
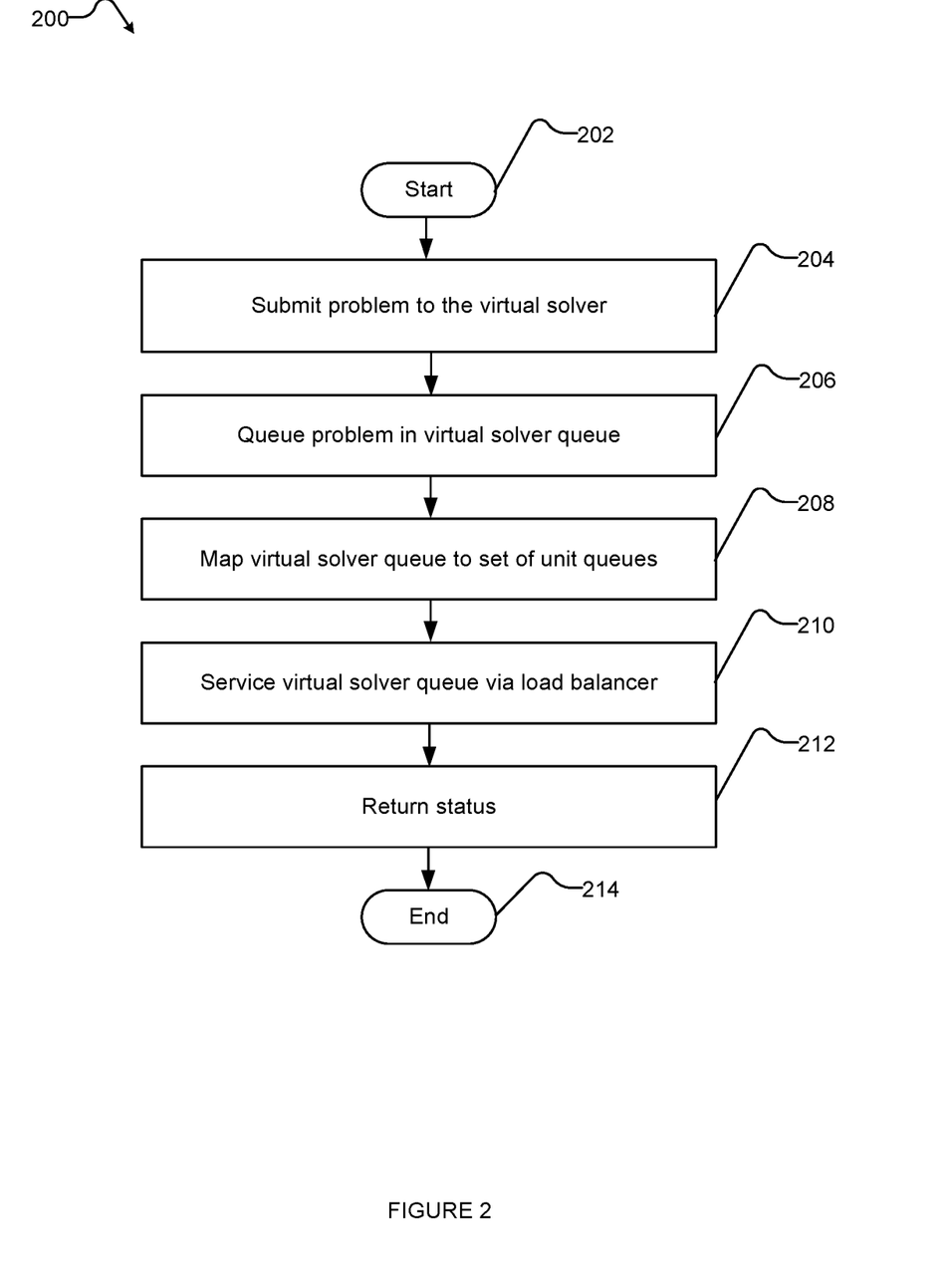
FIG. 2 is a flow diagram of an example method of sending a problem to a virtual solver in a hybrid computing system comprising a plurality of analog processors.

FIG. 2 is a flow diagram of an example method 200 of sending a problem to a virtual solver in a hybrid computing system comprising a plurality of analog processors. Method 200 comprises acts 202 to 214; however, a person skilled in the art will understand that the number of acts is an example, and, in some implementations, certain acts may be omitted, further acts may be added, and/or the order of the acts may be changed. Method 200 may be implemented by a digital processor in a hybrid computing system comprising at least one digital processor and a plurality of quantum processors and may be executed following method 100.

Method 200 starts at 202, for example in response to a call from another routine.

At 204, the digital processor submits a problem to a virtual solver. In some implementations, the digital processor submits the problem via solver application programming interface (SAPI). The virtual solver is backed by a pool of physical quantum processors. The virtual solver may have been selected previously, for example using method 100 of FIG. 1.

At 206, the contract layer queues the problem into the virtual solver's queue.

At 208, the contract layer maps the virtual solver queues to the physical queues of the physical quantum processors backing the virtual solver.

At 210, a load balancer services the virtual solver queue by dispatching a task to one of the physical queues of the physical quantum processors.

At 212, the contract layer returns the status of the problem submission to the digital processor. The status of the problem submission may be one of: succeeded or failed.

At 214, method 200 terminates, until it is, for example, invoked again.

Figure 3:
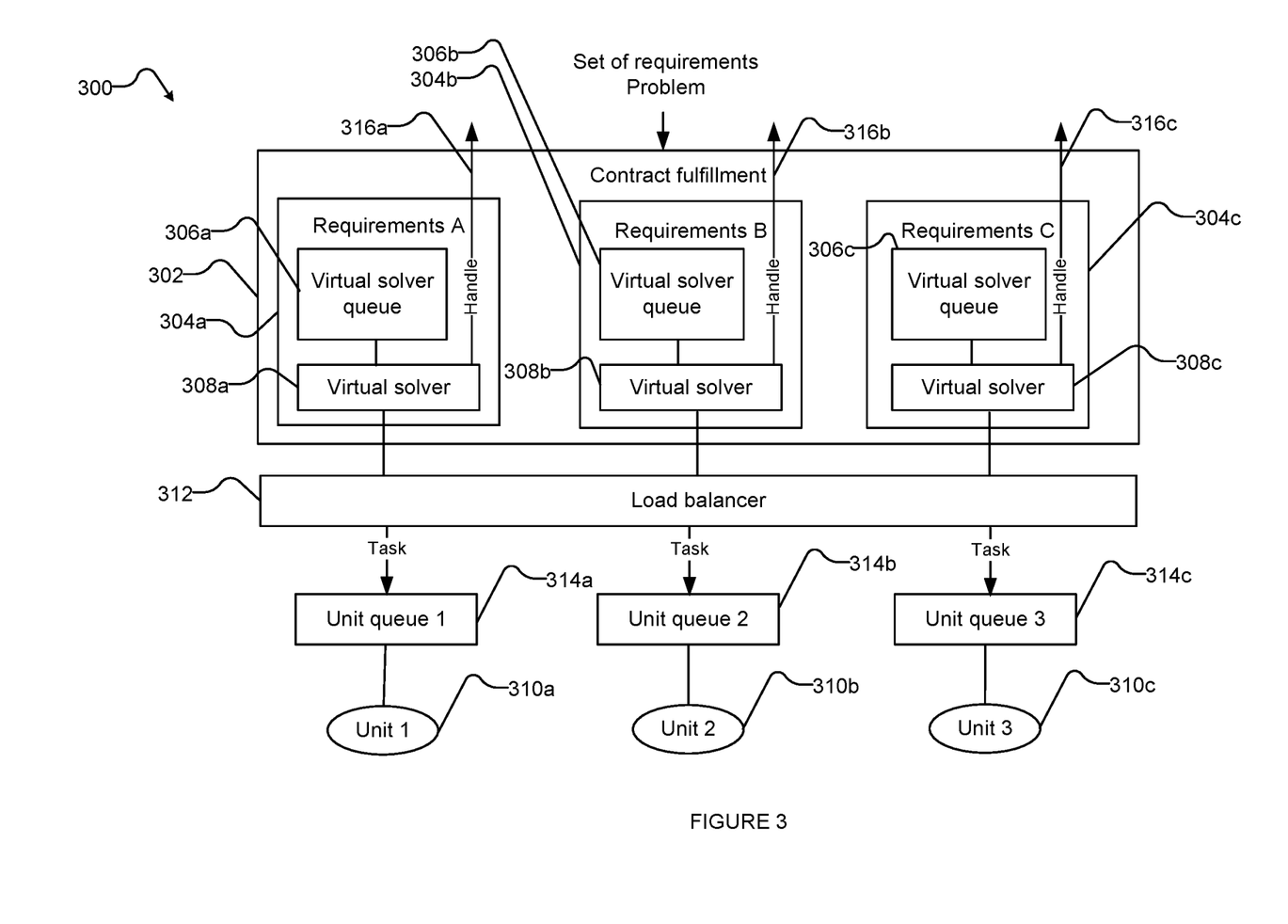
FIG. 3 is a schematic representation of an example system that selects a virtual solver and sends a problem to the virtual solver, according to the present disclosure.

FIG. 3 is a schematic representation of an example system 300 that selects a virtual solver and sends a problem to the virtual solver, according to the present disclosure. Elements of system 300 can be stored in a non-transitory computer-readable storage medium. The non-transitory computer-readable storage medium, when executed, causes a digital processor perform actions involving elements of system 300.

System 300 comprises a contract fulfillment 302, which can represent an abstraction layer to select and interact with a virtual solver. Contract fulfillment 302 comprises a plurality of requirements 304a, 304b, 304c (collectively, 304. Only three shown in FIG. 3 for simplicity), where each requirement 304 represents a fulfillment of a unique set of requirements. Example of requirements are:

The system is online.
system has at least 2000 active qubits.
system supports custom anneal schedule.
anneal schedule can have at least 4 control points.
system's target graph contains a subgraph (V,E).

Each requirement 304 comprises a virtual solver queue 306a, 306b, 306c (collectively 306, only three shown in FIG. 3) and a virtual solver 308a, 308b, 308c (collectively 308, only three shown in FIG. 3). Virtual solvers 308 are an abstraction of one or more physical computing systems, for example one or more analog processor or a quantum processor, or a set of physical computing system, where all physical computing system in the set fulfill the same requirement 304. For example, virtual solver 306a is backed by a pool of physical quantum processors 310a, 310b, 310c (herein also referred to as units 310a-310c, collectively 310, only three shown in FIG. 3 for simplicity) all fulfilling requirements 304.

A person skilled in the art will understand that one physical unit 310 may be fulfilling more than one requirement 304, thus one physical unit 310 may be abstracted or represented by more than one virtual solver 308.

System 300 comprises a load balancer 312 that receives the virtual solver queue and distributes the virtual solver queue to physical computing systems queues (herein also referred to as unit queues), according to the set of requirements and according to which unit queue are mapped to the virtual solver queue. Load balancer 312 distributes tasks to physical computing systems (herein also referred to as units) as the physical computing systems become available. Load balancer 312 routes tasks to physical unit queues 314, where each physical unit queue 314 is a queue for a physical resource (or unit) 310.

Alternatively, each virtual solver queue 306 is communicatively coupled to a unique load balancer that services only the set of units mapped to a virtual solver, given that only units queues in one virtual queue are interchangeable. In this case, one unit may be attached to more than one unique load balancer and therefore to multiple virtual solvers.

In an example operation, contract fulfillment 302 receives a set of requirements (e.g. requirement 304a). The set of requirements may be provided by a digital processor or may be specified by a user. Contract fulfillment 302 will select a virtual solver 308a that fulfills the set of requirements 304a.

In response to fulfilling the set of requirements 304a, virtual solvers 308a returns handle 316a. Handle 316a is then used by a digital processor when sending a problem to the set of physical computing systems.

An example use of system 300 is described in FIGS. 1 and 3.

Figure 4:
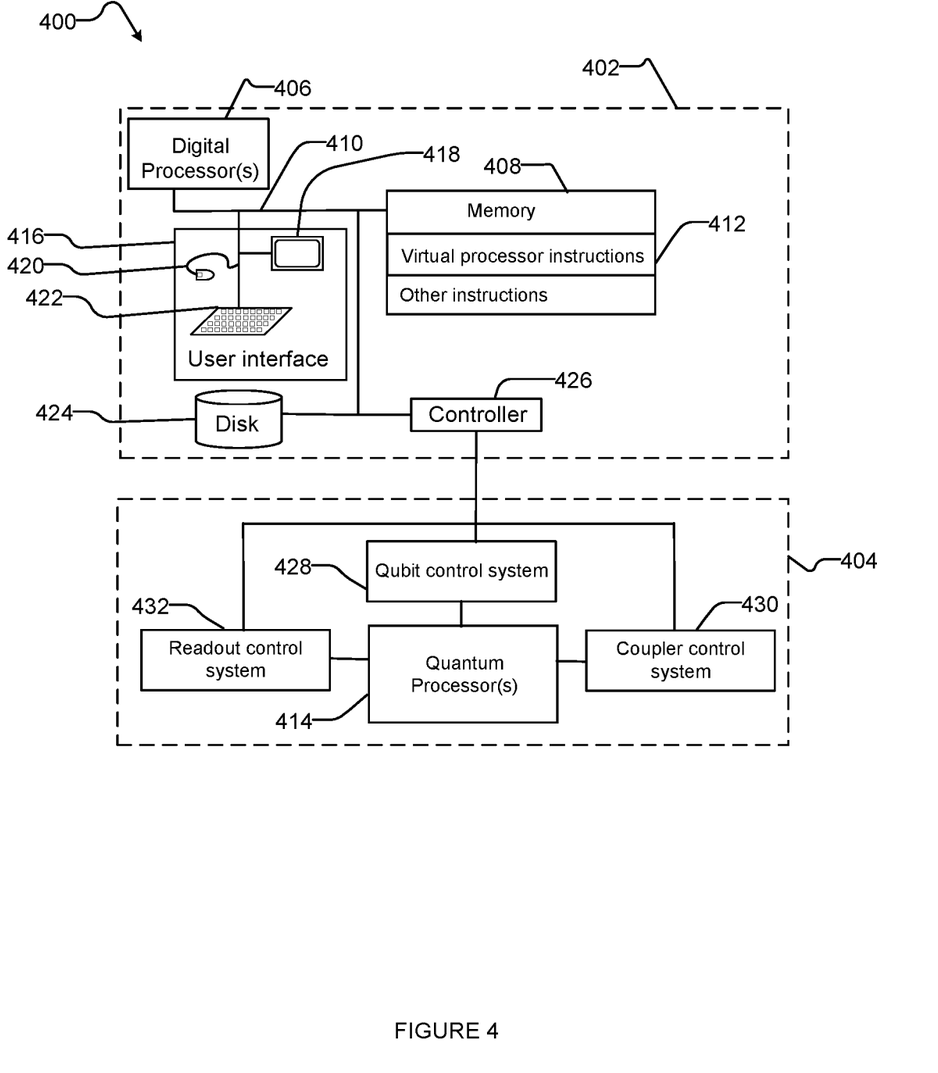
FIG. 4 is a schematic diagram of an exemplary computing system including a digital computer and an analog computer, according to the present disclosure.

FIG. 4 illustrates a computing system 400 comprising a digital computer 402. The example digital computer 402 includes one or more digital processors 406 that may be used to perform classical digital processing tasks. Digital computer 402 may further include at least one system memory 408, and at least one system bus 410 that couples various system components, including system memory 408 to digital processor(s) 406. System memory 408 may store a QPU model instructions module 412 and other instructions. Other instructions can include methods for selecting a virtual solver and sending a problem to a virtual solver. System memory 408 may store processor-executable instructions to cause one or more processors to implement methods of gathering and modifying devices, methods of aggregating and retrieving data from an object device model, and methods of persisting and managing aggregate data. System memory 408 can store methods that can each be applied to a plurality of algorithms, for example, calibration algorithms.

The digital processor(s) 406 may be any logic processing unit or circuitry (e.g., integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 400 comprises an analog computer 404, which may include one or more quantum processors 414. Digital computer 402 may communicate with analog computer 404 via, for instance, a controller 426. Certain computations may be performed by analog computer 404 at the instruction of digital computer 402, as described in greater detail herein.

Digital computer 402 may include a user input/output subsystem 416. In some implementations, the user input/output subsystem includes one or more user input/output components such as a display 418, mouse 420, and/or keyboard 422.

System bus 410 can employ any known bus structures or architectures, including a memory bus with a memory controller, a peripheral bus, and a local bus. System memory 408 may include non-volatile memory, such as read-only memory ("ROM"), static random access memory ("SRAM"), Flash NAND; and volatile memory such as random access memory ("RAM") (not shown), which may comprise the non-transitory computer- or processor-readable storage media.

Digital computer 402 may also include other non-transitory computer- or processor-readable storage media or non-volatile memory 424. Non-volatile memory 424 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a rigid spinning magnetic disk or a magnetic floppy disk or diskette. Non-volatile memory 424 may communicate with digital processor(s) via system bus 410 and may include appropriate interfaces or controllers 426 coupled to system bus 410. Non-volatile memory 424 may serve as long-term storage for processor- or computer-readable instructions, data structures, or other data (sometimes called program modules) for digital computer 402.

Although digital computer 402 has been described as employing hard disks, optical disks and/or solid state storage media, those skilled in the relevant art will appreciate that other types of non-transitory and non-volatile computer-readable media may be employed, such magnetic cassettes, flash memory cards, Flash, ROMs, smart cards, etc. Those skilled in the relevant art will appreciate that some computer architectures employ non-transitory volatile memory and non-transitory non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 408. For example, system memory 408 may store instruction for communicating with remote clients and scheduling use of resources including resources on the digital computer 402 and analog computer 404. Also for example, system memory 408 may store at least one of processor executable instructions or data that, when executed by at least one processor, causes the at least one processor to execute the various algorithms to execute instructions to methods for selecting and sending problems to virtual solver described herein. For instance, system memory 408 may store a virtual processor instructions module 412 that includes processor- or computer-readable instructions to request a virtual solver based on a set of requirements and to send a problem to the virtual solver, as described in greater detail herein.

In some implementations system memory 408 may store processor- or computer-readable calculation instructions and/or data to perform pre-processing, co-processing, and post-processing to analog computer 404. System memory 408 may store a set of analog computer interface instructions to interact with analog computer 404. Analog computer 404 may include at least one analog processor such as quantum processor 414. Analog computer 404 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cryogenically cool the analog processor, for example to temperature below approximately 1 Kelvin.

Analog computer 404 can include programmable elements such as qubits, couplers, and other programmable devices. Qubits can be read out via readout system 432. Readout results can be received by other computer- or processor-readable instructions of digital computer 402. Qubits can be controlled via a qubit control system 428. Qubit control system 428 can include on-chip DACs and analog lines that are operable to apply a bias to a target device. Couplers that couple qubits can be controlled via a coupler control system 430. Coupler control system 430 can include tuning elements such as on-chip DACs and analog lines. Qubit control system 428 and coupler control system 430 can be used to implement a quantum annealing schedule on analog processor 406.

The above described method(s), process(es), or technique(s) could be implemented by a series of processor-readable instructions stored on one or more non-transitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet, including but not limited to U.S. Provisional Application No. 62/889,264, are incorporated herein by reference, in their entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation of a hybrid computing system including at least one digital processor and a plurality of analog processors, the method executed by the at least one digital processor, the method comprising:
receiving a first set of requirements;
selecting a first virtual solver satisfying the first set of requirements;
identifying a first set of analog processors in the plurality of analog processors satisfying the first set of requirements;
returning a first handle to the first virtual solver;
receiving a problem via a solver application programming interface;
queuing the problem in a first virtual solver queue;
mapping the first virtual solver queue to a first set of analog processor queues of the first set of analog processors; and
servicing the first virtual solver queue via a load balancer.

2. The method of claim 1 wherein receiving a problem via a solver application programming interface includes receiving, by the first virtual solver, a problem.

3. The method of claim 1 wherein servicing the first virtual solver queue via a load balancer includes dispatching a first task to a first one of the first set of analog processor queues.

4. The method of claim 3 wherein dispatching a first task to a first one of the first set of analog processor queues includes sequentially dispatching the first task to each analog processor queue of the first set of analog processor queues.

5. The method of claim 3 wherein dispatching a first task to a first one of the first set of analog processor queues includes dispatching a first task to a first one of a set of quantum processor queues.

6. The method of claim 1 wherein mapping the first virtual solver queue to a set of analog processor queues includes mapping the first virtual solver queue to a set of quantum processor queues.

7. The method of claim 1 further comprising returning a problem status.

8. The method of claim 1 wherein receiving a first set of requirements includes receiving a first set of requirements for a first set of virtual solver features.

9. A computing system comprising:
at least one digital processor;
a plurality of analog processors; and
at least one non-transitory processor-readable medium communicatively coupleable to the at least one digital processor and that stores at least one of a set of processor-executable instructions or data which, when executed by the at least one digital processor, causes the at least one digital processor to:
receive a first set of requirements, wherein the first set of requirements are properties of at least one analog processor in the plurality of analog processors;
select a first virtual solver satisfying the first set of requirements;
identify a first set of analog processors in the plurality of analog processors satisfying the first set of requirements;
return a first handle to the first virtual solver;
receive a problem via a solver application programming interface;
queue the problem in a first virtual solver queue;
map the first virtual solver queue to a first set of analog processor queues of the first set of analog processors; and
service the first virtual solver queue via a load balancer.

10. The computing system of claim 9 wherein the non-transitory processor-readable medium stores processor-executable instructions which, when executed, causes the digital processor to receive, by the first virtual solver, a problem.

11. The computing system of claim 9 wherein the non-transitory processor-readable medium stores processor-executable instructions which, when executed, causes the digital processor to dispatch a first task to a first one of the first set of analog processor queues.

12. The computing system of claim 9 wherein the non-transitory processor-readable medium stores processor-executable instructions which, when executed, causes the digital processor to sequentially dispatch a first task to each analog processor queue of the first set of analog processor queues.

13. The computing system of claim 11 wherein the non-transitory processor-readable medium stores processor-executable instructions which, when executed, causes the digital processor to dispatch a first task to a first one of a set of quantum processor queues.

14. The computing system of claim 9 wherein the non-transitory processor-readable medium stores processor-executable instructions which, when executed, causes the digital processor to map the first virtual solver queue to a set of quantum processor queues.

15. The computing system of claim 9 wherein the non-transitory processor-readable medium stores processor-executable instructions which, when executed, further causes the digital processor to return a problem status.

16. The computing system of claim 9 wherein the non-transitory processor-readable medium stores processor-executable instructions which, when executed, causes the digital processor to receive a first set of requirements for a first set of virtual solver features.

* * * * *